US008234925B2

(12) United States Patent
Marconnet et al.

(10) Patent No.: US 8,234,925 B2
(45) Date of Patent: Aug. 7, 2012

(54) DEVICE AND METHOD FOR MONITORING THE VIBRATORY CONDITION OF A ROTATING MACHINE

(75) Inventors: Patrick Marconnet, Gueux (FR); Bernard Pottier, Reims (FR); Lanto Rasolofondraibe, Reims (FR)

(73) Assignee: Universite de Reims Champagne-Ardenne, Reims Cedex (FR)

( * ) Notice: Subject to any disclaimer, the term of this patent is extended or adjusted under 35 U.S.C. 154(b) by 603 days.

(21) Appl. No.: 12/436,903

(22) Filed: May 7, 2009

(65) Prior Publication Data
US 2009/0266169 A1 Oct. 29, 2009

Related U.S. Application Data

(63) Continuation of application No. PCT/FR2007/001807, filed on Oct. 31, 2007.

(30) Foreign Application Priority Data

Nov. 7, 2006 (FR) ...................................... 06 09705

(51) Int. Cl.
*G01H 1/00* (2006.01)
*G01H 1/08* (2006.01)
*G01H 1/04* (2006.01)
(52) U.S. Cl. ................ 73/660; 73/593; 73/659
(58) Field of Classification Search .................... 73/660, 73/593, 659
See application file for complete search history.

(56) References Cited

U.S. PATENT DOCUMENTS

| 4,471,295 | A  | * | 9/1984 | Vermeiren ..................... 324/671 |
|---|---|---|---|---|
| 7,634,913 | B2 | * | 12/2009 | Singh et al. ..................... 60/772 |
| 7,839,294 | B2 | * | 11/2010 | Orlowski et al. ............. 340/682 |
| 7,950,848 | B2 | * | 5/2011 | Kimura et al. ................. 374/141 |
| 8,029,233 | B2 | * | 10/2011 | Hoffmann et al. ............ 415/118 |
| 2007/0277612 | A1 | * | 12/2007 | Ehrfeld et al. ................... 73/593 |
| 2009/0229367 | A1 | * | 9/2009 | Boetius et al. .................. 73/660 |
| 2011/0116733 | A1 | * | 5/2011 | Siraky et al. .................... 384/448 |

FOREIGN PATENT DOCUMENTS

| EP | 0060588 | 9/1982 |
| WO | WO 83/04436 | 12/1983 |
| WO | WO 8304436 A * | 12/1983 |

OTHER PUBLICATIONS

International Search Report issued in PCT/FR2007/001807 mailed Jun. 10, 2008; 4 pages.

* cited by examiner

*Primary Examiner* — Lisa Caputo
*Assistant Examiner* — Jamel Williams
(74) *Attorney, Agent, or Firm* — Summa, Additon & Ashe, P.A.

(57) ABSTRACT

This present invention is a device having a mechanical bearing formed by two coaxial rings, one fixed relative to the machine and the other rotating, between which at least one rolling element is moveably positioned, at least one non-conducting positioning arrangements secured to the fixed bearing ring, the positioning arrangements including at least one placement holder for at least one conducting element forming a first plate of a capacitor, at a distance from a conducting part of the rotating ring forming the second plate of the capacitor, and with the positioning arrangements attached to at least one partitioning arrangements, the partitioning arrangements being used to create a space between the two plates, thus forming a dielectric insulating medium, and to act as a sealed enclosure for this insulating medium by being in contact with a part of the surface of the rotating ring.

23 Claims, 3 Drawing Sheets

DEVICE AND METHOD FOR MONITORING THE VIBRATORY CONDITION OF A ROTATING MACHINE

CROSS-REFERENCE TO PRIORITY APPLICATIONS

This application is a continuation of and claims the benefit of the commonly assigned French Patent Application Serial No. FR 06 09705 (filed Nov. 7, 2006, in the French Patent Office), and the commonly assigned International Patent Application No. PCT/FR2007/001807 (filed Oct. 31, 2007, in the European Patent Office), both of which are hereby incorporated by reference in their entirety.

FIELD OF THE INVENTION

This present invention relates to the field of mechanical components of rotary machines, in which the rotary mechanisms are vulnerable to unbalance conditions or are liable to excite the structure of machines such as turbines, alternators, motors or engines and gearboxes, etc., and more particularly to the field of roller bearings, ball bearings or needle bearings.

BACKGROUND

The bearings are mechanical components that guide the rotation of a shaft in a bearing assembly while limiting the friction effects that could be brought about by the movement of one of the two parts in relation to the other. The bearings are formed by two coaxial rings, one being the inner ring and the other the outer, between which mobile elements are placed and held. These mobile elements, which are generally balls, although trapped between the two coaxial rings, allow the rotation of one of the rings in relation to the other.

In some models, the balls are replaced by cylindrical or tapered rollers. The bearings are then capable of supporting a higher radial force in relation to the conventional ball bearings. Likewise, some bearings, described as needle bearings, employ rollers of small diameter compared to their length, giving them the advantage of being less bulky by virtue of a reduced radial space.

And yet, although the use of bearings reduces the friction effects due to the rotation of a shaft in its bearing assembly, fatigue in the mechanical components will appear once a certain number of rotations has been exceeded. This deterioration reaches the rolling parts such as the rings. The deterioration can take the form of normal wear, surface chipping, corrosion, seizing, abrasion, etc., which then generates an impact, or can take the form of an unbalance in the shaft causing a dynamic lack of balance. This deterioration in the condition of the mechanism then leads to vibration, which increases with the wear.

It is therefore known that if the increase in the vibrations is used to detect a fault, then examining the characteristics of the vibration spectrum of the machine can be used to identify its cause and therefore to determine the time remaining until the critical threshold will be reached. This vibration varies according to the type of damage to the mechanism. Unbalance conditions from an unbalance in the shaft produces a sinusoidal excitation while surface chipping on a track in a bearing brings about a shock wave that leads to pulse-type excitation at the passage of each of the mobile elements of the bearing over the irregularity.

Currently, the main method employed to characterise and monitor the state of each essential component in a rotary machine consists of using vibration sensors of the accelerometric type. The phenomenon exploited in this type of sensor is called piezoelectricity. Under the action of a mechanical force, certain bodies can become polarised. In order to exploit this property, the piezoelectric sensors take the form of a disk, in which each of the surfaces is connected to an electrode. A pressure on one face of the sensor generates a mechanical stress that polarises the sensor. The charge generated is then amplified so that it can be measured.

In order that the piezoelectric sensors can measure the vibrations due to damage, the piezoelectric sensors are positioned close to strategic points of the main components of the monitored machine. The frequency of the vibrations in the bearing leads to stress/pressure frequencies at the surface of the sensor, which are then converted into the form of a variation in an electrical test signal.

It emerges that the use of such sensors has many drawbacks. In addition to their high cost, these sensors cannot always be positioned as close as necessary to the source at the origin of any vibration. However, the vibrations engendered by the faults in the bearing have the particular feature of propagating throughout the structure of the machine. These vibrations can thus change medium due to a change in the nature of the materials, which then gives rise not only to refraction or reflection phenomena, but also to conversion of the propagation mode. It is therefore important, in order to correctly measure the vibration in a machine, that the sensors are positioned at optimal measurement points. In the case where use is made of acceleration-measuring or piezoelectric sensors, reaching these optimal measurement points is not always possible. Unfortunately, the vibration is damped or attenuated as it moves away from the source at which it was generated. The placement of these sensors at a distance from the source of the vibration then results in a significant attenuation of the measured signal.

In addition, it is necessary to note that these vibration sensors have a measurement quality that depends on the surface against which they are positioned. This surface must be able to correctly transmit the measured vibration so that there is no loss of information

SUMMARY OF THE INVENTION

The purpose of this present invention is to provide a sensor that is capable of overcoming one or more drawbacks of the prior art while also improving the quality of the measured vibration signal and proposing a low-cost solution.

This objective is attained by a device for monitoring the vibration generated by a bearing in a machine, formed by two coaxial rings, one outer and the other inner, with one fixed in relation to the structure of the machine and the other rotating, between which at least one rolling element is trapped and able to move, as well as the vibration, generated by other components of the machine, that passes through this bearing, with each of the components of the machine possessing its own frequency signature. In other words, vibrations generated by other components of the machine pass through the bearing, whereby each of the other components of the machine has its own frequency signature. The device includes at least one non-conducting positioning means, fitted tightly onto the bearing ring that is fixed in relation to the structure of the machine, with the non-conducting positioning means including at least one housing forming a means for positioning at least one conducting element, constituting a first plate of a capacitor, at a distance from a conducting part of the rotating ring, forming the second plate of the capacitor, and with the non-conducting positioning means being attached to at least one partitioning means, with the partitioning means being used to create a space between the two plates that forms a dielectric insulating medium and to act as a sealed enclosure for this insulating medium by being in contact with a part of the surface of the rotating ring.

According to another variant of the invention, the device is characterised in that the partitioning means is formed by a metal blade attached to the positioning means and in contact with a part of the surface of the rotating ring.

According to another variant of the invention, the device is characterised in that the partitioning means is formed by an elastic gasket attached to the positioning means, where the elastic gasket has a lip that is in contact with a part of the surface of the rotating ring.

According to a variant of the invention, the device is characterised in that the non-conducting positioning means positions at least three conducting plates radially in relation to the second conducting plate formed by a part of the rotating ring of the bearing, where the axes passing respectively through the positions of each of the conducting elements and the center of rotation of the bearing form angles of not more than about 120° between each other.

According to another variant of the invention, the device is characterised in that one of the facing conducting plates is convex and the other concave, in a plane that is perpendicular to the axis of rotation of the bearing. In other words, the conducting plates define faces that oppose one another and the opposing conducting plates comprise a convex plate and a concave plate in a plane that is perpendicular to the axis of rotation (Z-Z) of the bearing.

According to another variant of the invention, the device is characterised in that the non-conducting positioning means positions the first conducting plate axially in relation to the second conducting plate formed by a part of the surface of the rotating ring of the bearing.

According to another variant of the invention, the device is characterised in that the non-conducting positioning means positions a pair of conducting plates, one radially and the other axially, in relation to the conducting plate formed by a part of the surface of the rotating ring of the bearing.

According to another variant of the invention, the device is characterised in that a single space forming the dielectric insulating medium is common firstly to the pair of capacitors formed by the two conducting plates positioned by the non-conducting positioning means and, secondly, the conducting plate formed by one part of the surface of the rotating ring of the bearing.

One advantage of the invention is that the capacitive sensor formed by the pair of capacitor plates can be placed inside the bearing, that is to say at the optimum position in which all of the vibration information transits, so that it is free of any damping.

Another advantage of the invention is that these sensors are positioned as close as possible to the parts in movement, allowing one to obtain a signal of high quality with little loss.

Another advantage of the invention is that these capacitive sensors provide access firstly to the radial forces and secondly to the axial forces of the bearings.

Another advantage of the device of the invention is characterised by its small size which enables it to be incorporated directly into the machine.

Another advantage contributed by the invention is the low cost of its implementation. This allows the invention to be used systematically during the design at the industrial level and thus to continuously monitor the vibration state of the machine and therefore the level of machine damage.

According to another variant of the invention, the device is characterised in that at least one non-conducting positioning means positions three pairs of conducting elements on each face of the bearing, with these three pairs being positioned equidistant from the axis of rotation of the bearing so that, in a plane perpendicular to the axis of rotation of the bearing, the planes passing respectively through the axes of symmetry of each of the pairs of conducting elements and the center of rotation of the bearing form angles of not more than about 120° between them, where each of the three pairs of conducting elements includes a first conducting element positioned radially and a second conducting element positioned axially in relation to the rotating ring of the bearing, to respectively form the first plates of six different capacitors.

Another advantage of one device according to the invention with several capacitive sensors placed at 120° in relation to the coaxial axis of the rings of the bearing is that the location of any fault is found with greater accuracy.

According to another variant of the invention, the device is characterised in that the non-conducting positioning means is a non-conducting ring attached to the ring of the bearing that is fixed in relation to the structure of the machine.

Another advantage of the device of the invention is that the use of a non-conducting ring as the positioning means allows fast and accurate positioning of the different capacitive sensors on the bearing.

According to another variant of the invention, the device is characterised in that it includes at least one means for adjusting the distance that separates the plates participating in the formation of (i.e., forming a part of) a given capacitor. The means for adjusting may include any tool or device, separate from or integral with the present invention, that is capable of adjusting the distance separating the plates.

Another advantage of the device of the invention is that adjusting the distance between the plates allows one to determine the sensitivity and the value of the unloaded capacitor.

According to another variant of the invention, the device is characterised in that the pairs of plates of each of the capacitors are associated respectively with an electronic circuit forming a charge amplifier intended to deliver, in real time, a signal representing the movements of one plate in relation to the other due to vibration during the operation of the mechanical bearing.

According to another variant of the invention, the device is characterised in that each pair of plates is associated with an electronic circuit forming a charge amplifier (CA), the second plate formed by the rotating ring is connected to the earth (i.e., grounded) and the first plate positioned by a non-conducting positioning means is connected to the inverting input of a high-impedance integrated linear amplifier (ILA) by a screened cable, the screen of which is connected to the non-inverting input of the ILA, with the non-inverting input of the ILA being connected to a generator supplying a direct voltage, and with the output of the ILA being connected to its inverting input via a capacitor and resistor mounted in parallel.

According to another variant of the invention, the device is characterised in that the output of the integrated linear amplifier is connected to the input of an analogue to digital converter, the output of which is used by a microprocessor circuit to calculate the distance variation, by the execution of a program implementing the following formula:

$$\Delta x = -\frac{C_f}{2 \cdot V \cdot S_c} \Delta V_s$$

and to set off an alarm by comparing the result obtained with a stored threshold, with Δx representing the variation of the distance (d) separating the two capacitor plates, ΔVs representing the variation of the voltage at the output of the amplifier, V representing the DC component of the voltage at the input of the amplifier, Sc representing the sensitivity of the capacitance and Cf representing the capacitance of the capacitor connecting the output of the ILA to the inverting input.

Another advantage of the device according to the invention is that measurement of the vibration signal is performed with very high immunity to background noise, with a very small polarisation current.

According to another variant of the invention, the device is characterised in that it includes a means for detecting the frequency of rotation of the bearing in order to perform measurements when the rings of the bearing are in a particular position in relation to each other.

According to another variant of the invention, the device is characterised in that the device includes at least one means for frequency processing of (i.e., processing the frequency of) the measured vibration signal at the capacitor plates allowing one to obtain the vibration signal of at least one of the various components of the machine by comparison with the respective vibration signature of each of the components of the machine recorded in at least one storage resource.

According to another variant of the invention, the device is characterised in that the device includes at least one means for time processing of (i.e., processing the timing of) the vibration signal of at least one of the components of the machine, allowing one to obtain several statistical parameters of this signal to be compared with statistical fault parameters recorded in a storage resource.

Another objective of the invention is to propose a method that can be used to measure, in real time, precisely and at a distance, small capacitance variations due to the vibration in the bearing while avoiding the measurement of parasitic capacitance due to an antenna effect.

This objective is attained by virtue of a method of surveillance of the vibration generated by a bearing in a machine, formed by two rings, one fixed and the other rotating, including at least one capacitive sensor, and of the vibration, generated by other components of the machine, that passes through this bearing, characterised in that it includes at least one stage for measuring the induced charges by capacitive coupling to a first conducting plate of the variable-gap capacitor positioned by a non-conducting positioning means, attached to the ring that is fixed in relation to the structure, with a second conducting plate formed by one part of the surface of the rotating ring of the bearing being at a fixed potential.

According to a variant of the invention, the method is characterised in that with the pair of plates being associated with an electronic circuit forming a charge amplifier, with the plate being formed by the rotating ring connected to earth, with the plate being positioned by the non-conducting positioning means and connected to the inverting input of a high-impedance integrated linear amplifier (ILA) by a screened cable, the screen of which is connected to the non-inverting input of the ILA, with the non-inverting input of the ILA being connected to a generator supplying a direct voltage, and the output of the ILA being connected to its inverting input via a capacitor and resistor mounted in parallel, the method includes at least one stage for calculating the variation of the distance separating the two capacitor plates from the variation of the voltage at the output of a charge amplifier, using the following relation:

$$\Delta x = -\frac{C_f}{2 \cdot V \cdot S_c} \Delta V_s$$

with Δx representing the variation in the distance (d) separating the two capacitor plates, ΔVs representing the variation in the voltage at the output of the amplifier, V representing the DC component of the voltage at the input of the amplifier, Sc representing the sensitivity of the capacitance and Cf representing the capacitance of the capacitor connecting the output of the ILA to the inverting input.

According to a variant of the invention, the method is characterised in that, with the output of the integrated linear amplifier (ILA) being connected to the input of an analogue to digital converter, the output of which is used by a microprocessor circuit to calculate the distance variation by the execution of a program, the method includes at least one stage for triggering an alarm after comparison of the variation (Δx) in the gap between the two plates with a threshold value.

According to another variant of the invention, the method is characterised in that, with the device including a storage resource for the vibration signature of each of the components of the machine, the method comprising the steps of:
 a stage for or step of measuring the vibration signal at the capacitor plates positioned at the bearing,
 a stage for or step of comparing the measured vibration signal with the stored vibration signature from at least one given component of the machine,
 a stage for or step of determining and then extracting the vibration signal proper to the given component of the machine from the measured vibration signal.

According to another variant of the invention, the method is characterised in that, with the device including a resource for storing the fault threshold values of several statistical parameters, the method comprising the steps of:
 a stage for or step of measuring the vibration signal at the capacitor plates positioned at the bearing,
 a stage for or step of calculating the statistical parameters of the measured vibration signal,
 a stage for or step of comparing the calculated statistical parameters with stored fault threshold values,
 a stage for or step of determining the severity of the fault.

According to another variant of the invention, the method is characterised in that, with the device including at least one display means (e.g., a display screen or monitor), the method includes at least one stage or step of displaying the severity and the position of a fault on a display screen or monitor.

One advantage of the invention is that, with the method including at least one stage for processing the signals delivered by the capacitive sensors by the use of at least one vibration analysis technique, it allows one to determine the origin, the nature and/or the severity of the faults in bearings and in other monitored components of the machine.

Another advantage of the invention is that the method allows continuous monitoring of the bearing and of the components of the machine.

BRIEF DESCRIPTION OF THE DRAWINGS

The foregoing and other objects and advantages of the invention and the manner in which the same are accomplished will become clearer based on the following detailed description taken in conjunction with the accompanying drawings in which.

DETAILED DESCRIPTION

Figures 1, 3:
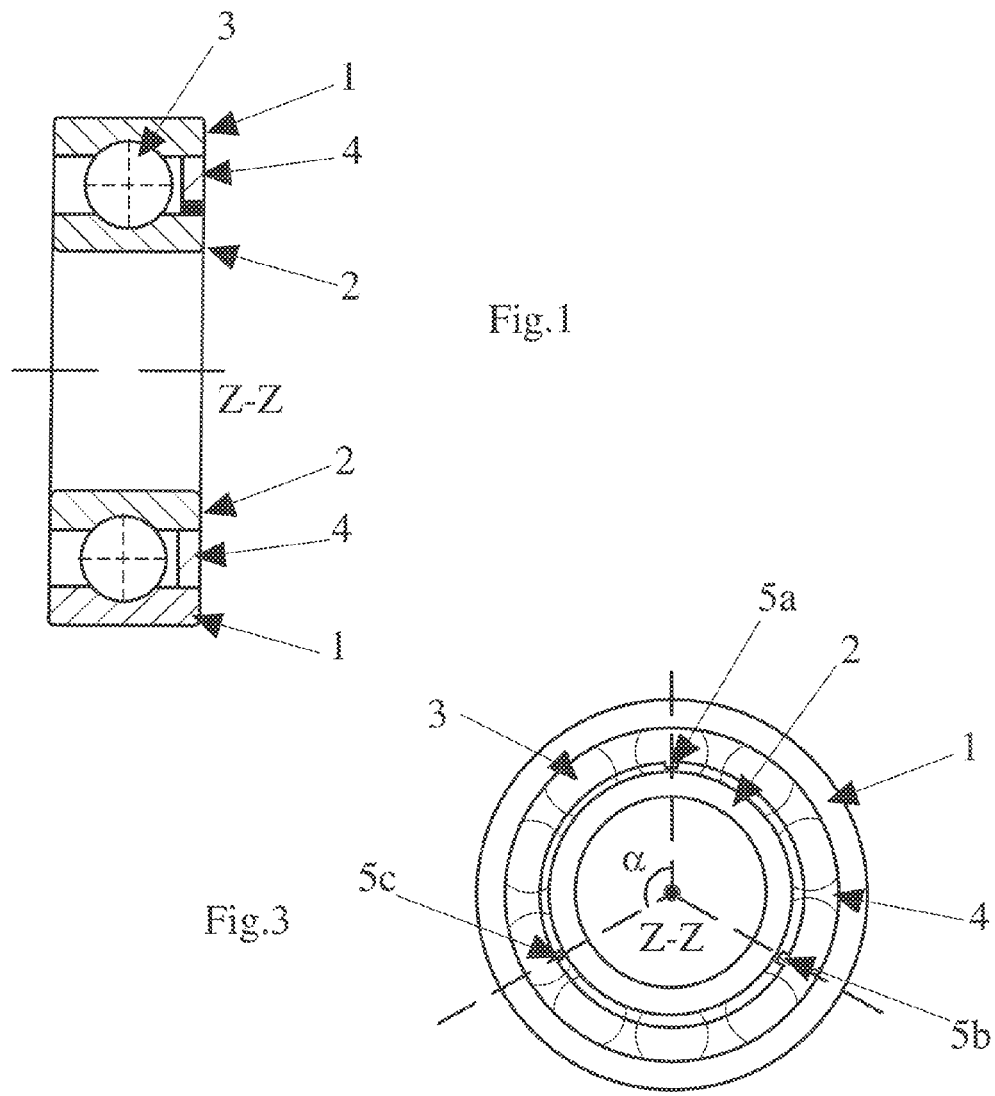
FIG. 1 represents a view of the device of the invention along an axis that is perpendicular to the axis of rotation of the bearing, the device being represented in section in a plane passing through the axis of rotation (Z-Z) of the bearing.
FIG. 3 represents a view of the device of the invention along the axis of rotation (Z-Z) of the bearing.

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The mechanical bearing is formed from two coaxial rings, one inner (2) and the other outer (1,) between which rolling elements (3) are placed and held trapped. Stated differently, the rolling elements are movably positioned, or capable of moving, between the outer and inner ring. These various parts are generally made of steel in order to be resistant to compression. The inside face of the outer ring (1), as well as the outside face of the inner ring (2), comprise an incurving track to match the shape of the rolling elements (3). The combination of the two tracks located on the respective rings ensures the trapping of the rolling elements (3) between the two rings (1, 2) while also guaranteeing their movement on a circular circuit centered on the axis of rotation (Z-Z) of the bearing, coaxial to the two rings. The gap between the rolling elements is held constant by virtue of a cage (not shown in the figures).

The rolling elements (3) can be of several types. Generally speaking they are balls, but in certain models the balls are replaced by cylindrical or tapered rollers. The bearings are then capable of supporting a higher radial force in relation to the conventional ball bearings. In order to reduce the radial space, the diameter of the rollers can be reduced in relation to their length, and the rolling elements are then called needles. The different rolling elements (3) are generally held at a distance from each other by a cage which distributes them evenly in the circular circuit formed by the two rings (1, 2).

In order to eliminate any play, and at the same time any unwanted vibration that might falsify the measurements, the mechanical bearing is slightly pre-stressed. At least one additional, non-conducting element is added onto the bearing. In one embodiment, the non-conducting element is a non-conducting positioning means (4) that is connected to one of the rings. In one embodiment, the non-conducting positioning means (4) is secured tightly to the bearing ring which remains fixed in relation to the structure of the machine. This ring that is fixed in relation to the structure can be either the outer ring (1) or the inner ring (2). In the context of the embodiment of the invention represented by the various figures, the outer ring (1) is fixed in relation to the structure while the inner ring (2) is mobile or rotating. The non-conducting positioning means (4), attached to the fixed ring, then takes up position at the radial opening located between the outer (1) and inner (2) rings so as to create a junction between the fixed ring and the rotating ring of the bearing.

This non-conducting positioning means, made from an insulating material, attached to the fixed ring of the bearing, forms a variable-gap capacitor with a part of the rotating ring of the bearing. To this end, the non-conducting positioning means (4) includes at least one placement holder (i.e., positioning means) used to position a first conducting plate (5) of the capacitor close to a conducting part of the rotating ring, which forms a second plate (6).

Stated differently, the present invention includes at least two conducting elements that form conducting plates (5, 6) of at least one capacitor. As configured, one plate (5) is positioned at a distance from the other plate (6), wherein the other plate (6) is formed by a conducting part of the rotating ring.

The distance that separates the two conducting plates (5, 6) is then very small, of at least about one tenth of one millimetre. The space (7) separating the two plates is a so-called dielectric insulating medium. In order to form this space, the non-conducting positioning means firstly positions the first plate (5) at a distance from the rotating ring, and secondly is associated with at least one partitioning means (8) that extends on each side of the plate (5) until it makes contact with the surface of part of the rotating ring. As configured, the partitioning means supports the non-conducting positioning means. Thus, the partitioning means (8), attached to the non-conducting positioning means (4), creates a space between the two conducting plates (5, 6), forming a dielectric insulating medium (7). In addition, the partitioning means (8) acts as a sealed container for the insulating medium (7) thus created. This partitioning means (8) can be formed by a metal blade attached to the positioning means (4), with the metal blade coming into contact with a part of the surface of the rotating ring. This partitioning means (8) can also be formed by an elastic gasket attached to the positioning means (4), where the elastic gasket has a lip that comes into contact with a part of the surface of the rotating ring.

Figure 2A:
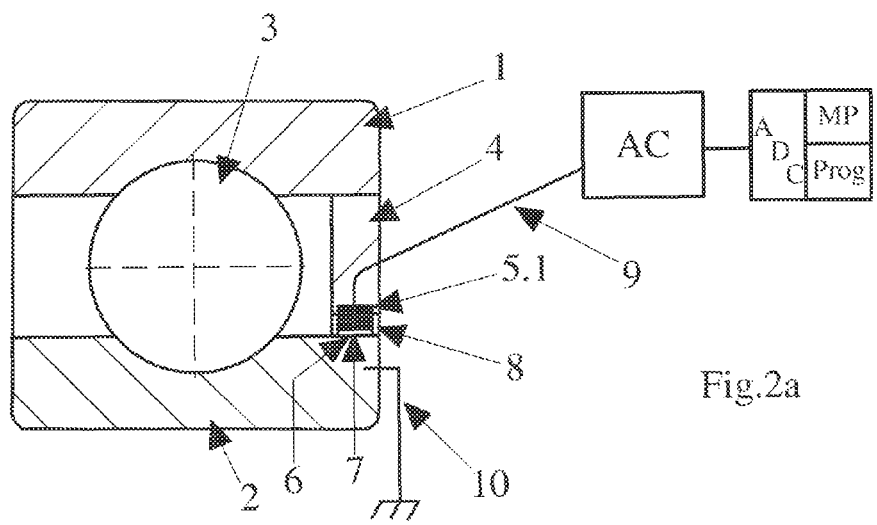
FIGS. 2a and 2b represent a detailed part of FIG. 1 (2a), as well as a variant (2b).
Figure 2B:
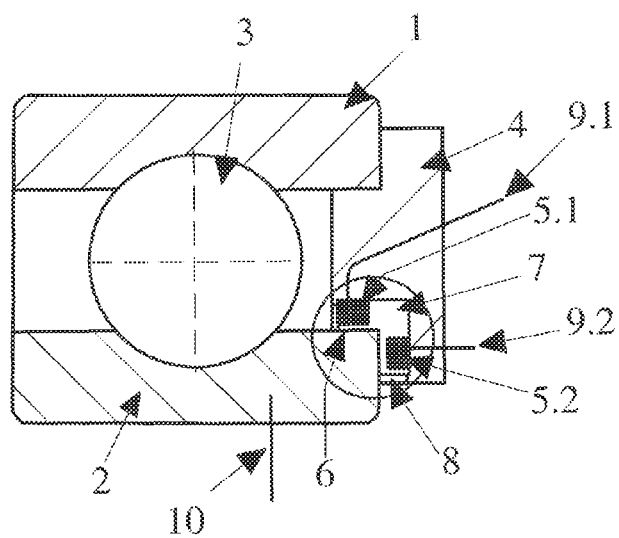

The positioning of the plate will differ according to the type of vibration measured. In the case of radial vibration measurements (see FIG. 2a), the non-conducting positioning means (4) positions the conducting plate (5.1) close to and radially in relation to the surface of the rotating ring, between the inner (2) and outer (1) rings of the bearing. In the case of axial vibration measurements, the non-conducting positioning means (4) places the conducting plate (5.2) close to one of the axial surfaces of the rotating ring, oriented toward the outside of the bearing. In both of these cases, the non-conducting positioning means (4) firstly positions a conducting plate (5) in relation to the conducting plate (6) of the rotating ring of the bearing, and secondly is attached to at least one means (8) for partitioning the space (7) that separates the two conducting plates (5, 6).

According to one particular embodiment, the non-conducting positioning means (4) positions two conducting plates (5.1, 5.2) at the same level of the rotating ring (see FIG. 3). One of these plates is a conducting plate (5.1) placed radially, and the other is a conducting plate (5.2) placed axially in relation to the conducting plate (6) formed by the rotating ring. In such a situation, the two conducting plates (5.1, 5.2), which are positioned by the non-conducting positioning means (4) opposite to different faces of the rotating ring, can share a common dielectric space (7). This dielectric space (7) is then partitioned by at least one partitioning means (8), attached to the non-conducting positioning means (4) and directed toward the surfaces of the rotating ring located facing the two conducting plates (5.1, 5.2) positioned by the non-conducting positioning means (4).

The two capacitors, respectively radial and axial, formed on the bearing, play the role of capacitive sensors. When the bearing generates axial or radial vibration, or indeed when it is traversed by this vibration, the relative movement of the conducting plate (6), formed by the surface of the rotating ring, in relation to each of the conducting plates (5.1, 5.2), positioned by the non-conducting positioning means (4), causes the capacitance of the capacitors to vary with time.

The variable-gap capacitors thus formed by the conducting plates (5, 6) separated by a dielectric insulating medium (7) have a capacitance of at least about one picofarad, with variations of at least about one femtofarad.

On the bearing, at least three non-conducting placement or positioning means (4), all attached to the bearing ring that is fixed in relation to the structure of the machine, each position at least one radial or axial capacitive sensor plate (5a, 5b, 5c), or a pair of capacitive sensors. The placement means (4) place these sensors equidistant from the axis of rotation of the bearing, so that in a plane perpendicular to the axis of rotation of the bearing, the axes passing respectively through the position of each of the sensors and the center of rotation of the bearing form angles ($\alpha$) of not more than about 120° between them.

The regular placement of these sensors on a given side of the bearing is used to facilitate the location of any fault that is causing vibration in a plane perpendicular to the axis of rotation of the bearing. The placement of these sensors provides a finer measurement of the vibration signal, and thus facilitates correction by rebalancing any fault of the unbalance type. Likewise, a regular and symmetrical placement of these sensors on each side of the bearing is used to facilitate the location of the source of the vibration in a plane containing the axis of rotation of the bearing. These various sensors thus allow the measurement, firstly, of the vibration signals coming directly from the bearing, and secondly, of the vibration signals coming from the various components of the machine and that propagate through the bearing. The vibration signal of each of the components of the machine then presents a unique frequency signature. In other words, a unique frequency signature is associated with each component of the machine.

The different non-conducting placement means (4), attached to the ring that is fixed in relation to the structure, can be created as a single structure. This structure can then take the form of a non-conducting ring that is attached to the ring which is fixed in relation to the structure. This insulating ring allows, during the industrial phase, to more easily position the capacitive sensors at strategic points of the bearing.

In order to measure the capacitance variations of the sensors as a function of the vibration, the conducting plates (5, 6) of the variable capacitors of the invention are associated with an electronic circuit, called a charge amplifier (CA), by means of appropriate connections (9.1, 9.2 and 10).

A first plate (6) is formed by one part of the surface of the rotating ring of the bearing, and a second (5) by a conductor located in facing but fixed in relation to the second plate (5). The variation of the capacitance of such a capacitor with time is given by the relation:

$$C(t) = \varepsilon \frac{S}{d - s(t)} = \varepsilon \frac{S}{x(t)}$$

where d is the distance separating the two plates, s(t) the amplitude of the variation of the mobile plate (6) in relation to its point of equilibrium, S the active area of the plates and $\varepsilon$ the permittivity of a vacuum.

The sensitivity of the capacitance ($S_c$) of the capacitor is then determined by the relation:

$$S_c = \frac{\Delta C}{\Delta x} = \frac{\Delta C}{\Delta(d - s(t))} = +\varepsilon \frac{S}{(d - s(t))^2} = +\varepsilon \frac{S}{[x(t)]^2} \approx +\varepsilon \frac{S}{d^2}$$

This sensitivity can be considered as a constant for small variations of s(t). Since the movements of the plate (6) are small, at least about a few micrometres, it is necessary to have high sensitivity. The distance d is then at least about several tens of times s(t), which determines the point of operation of the capacitor. As an example, for facing areas of S=5 mm², at a distance d=0.1 mm with the dielectric being air, we get a capacitor whose capacitance at the point of operation is equal to C=0.44 pF with a sensitivity of Sc=0.44.10⁴ pF/m, and for a movement s(t)=1 μm, the variation of capacitance is A$\Delta$=4.4 fF. The capacitors of the device have a capacitance of at least about one picofarad, with variations of at least about a few femtofarads.

Since the objective is to measure, with precision and at a distance, small capacitance variations that reflect, in real time, the variations of the distance between the two plates due to the vibration in the bearing, the so-called two-pole methods are not suitable since the measurement would then indicate the value of C(t)+Cp, in which Cp is the parasitic capacitance of the connecting wires, due to an antenna effect.

The method used consists of considering the induced charges by capacitive coupling to only one of the two plates, the other plate being at a fixed potential. The variation in the induced charges is then the analogue image of the movement s(t).

Figure 4:
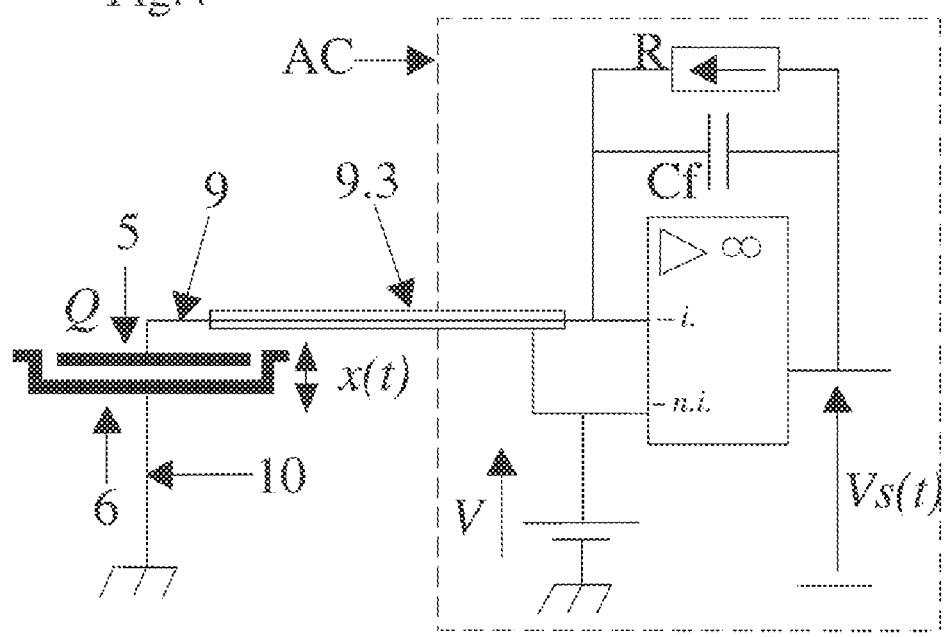
FIG. 4 represents a diagram of the electronic circuitry of the device of the invention.

A diagram of the electronic circuitry of the charge amplifier employed is presented in FIG. 4. The integrated linear amplifier (ILA) used should preferably be of the JFET, MOSFET or CMOS type, with a very high input impedance. This high impedance then provides it with a high immunity to noise with a polarisation current of less than about 2 fA.

In the circuit shown, the conducting plate (6) of the capacitor formed by a part of the rotating ring is connected to earth (i.e., grounded). The second conducting plate (5), positioned by the non-conducting positioning means (4), of each of the capacitors, is held by a ring and connected to the inverting input (i.) of a integrated linear amplifier (ILA) by a screened cable (9, 9.1, 9.2), the screen of which (9.3) is connected to the non-inverting input (n.i.) of the ILA. The ILA is connected via a direct-current (DC) voltage generator at its non-inverting input. In such a circuit, the parasitic capacitance (Cp) due to the connecting cable, which could interfere with the measurements, is not transferred to the output of the ILA. Only the DC component and the voltage variations due to the movement of the mobile plate (6) are then transferred to the output of the ILA. Between the output and the inverting input (i.) of the ILA, a capacitor with a capacitance of $C_f$ is placed in parallel with a resistance (R).

The relation that links the output voltage Vs (t) to the charge Q(t) on the plate (5) whose induced charges are measured is thus:

$$V_s(t) = -\frac{Q(t)}{C_f} = -V\frac{C}{C_f}$$

Since the induced charges are equal to: Q=CV, the charge variations due to the relative movement of the plates are given by: $\Delta Q = C\Delta V + V\Delta C = 2V\Delta C$ (since the voltage derived from the electric field between the two plates and the capacitance vary as $1/d$).

The relation which links the output voltage of the ILA to the vibration in the bearing is then:

$$\Delta V_s = -\frac{\Delta Q}{C_f} = -\frac{2 \cdot V \cdot \Delta C}{C_f} \Rightarrow \Delta C = -\frac{C_f}{2 \cdot V}\Delta V_s = S_c \cdot \Delta x$$

$$\Delta x = -\frac{C_f}{2 \cdot V \cdot S_c}\Delta V_s$$

in which: $\Delta x$ represents the variation of the distance d separating the two capacitor plates, $\Delta V_s$ represents the variation of the voltage at the output of the amplifier, V represents the DC component of the voltage at the input of the amplifier, $S_c$ represents the sensitivity of the capacitance, and $C_f$ represents the capacitance of the capacitor connecting the output of the ILA to the inverting input.

Thus, for example, if $\Delta x=1$ μm$=10^{-6}$ m and $C_f=1$ pF, V=5V, and Sc=$10^4$ pF/m$^2$=$10^{-8}$ F/m$^2$, then $V_s$=0.1V. The resistance R is negligible in the calculation of transmittance. If it is desired that $\Delta x$ and $\Delta V_s$ should be of the same sign, then voltage V can be negative.

The output of the integrated linear amplifier (ILA) can be connected to the input of an analogue to digital converter (CAN), the output of which is used by a microprocessor circuit (MP) in order to calculate the distance variation ($\Delta x$) by the execution of a program (Prog) using the following formula:

$$\Delta x = -\frac{C_f}{2 \cdot V \cdot S_c}\Delta V_s$$

and to allow the triggering of an alarm after comparing the result of the calculation with a stored threshold value. Specifically, the microprocessor is configured to activate an alarm when the calculated distance variation reaches a stored threshold value.

The device of the invention can be connected to a means for processing the measured vibration signal. The processing of this signal allows both temporal and frequency analysis.

In fact each rotating element of a mechanical machine is characterised by one or more frequencies that are characteristic of faults. For example, a bearing is characterised by three fault frequencies such as the frequency that is characteristic of a fault in a rolling element (3), and the fault frequencies of each of the inner (1) and outer (2) rings. These frequencies are first calculated from the geometrical characteristics of the bearing, such as the number of rolling elements (3), the diameter of the inner ring (2) and the diameter of the outer ring (1), as well as the speed of rotation of the motor, and then recorded in a storage resource. Then examining the power spectrum of the signal delivered by the capacitive sensor allows one to locate the fault or faults present in the bearing and to monitor, over time, any changes in the amplitude of each frequency in order to determine the number of cycles of operation of the component before a failure occurs.

In addition, the mechanical state of a bearing or of other rotating components of a mechanical machine can be characterised by statistical parameters described as fault indicators. Of these parameters, the most commonly used are the RMS (root mean square) value, also known as the effective value of the signal, the peak factor, formed by the ratio between the peak value and the effective value of the signal, or again the Kurtosis value or skewness, which is a measurement of the peaks or of the relative flattening of a distribution of a real random variable in relation to a Gaussian distribution. These various statistical parameters are calculated from the vibration signal of the bearing. It thus involves detecting a meaningful change in these parameters, by comparison with threshold values recorded in a storage resource. The determination of these threshold values is effected beforehand either by experimentation on the machine or by the use of statistical laws. Characterisation of the fault and estimation of its severity then allow a diagnosis to be made.

Thus when a fault appears on a component of the machine, it is easy to estimate its degree of severity, to monitor its development and, where appropriate, to forecast the replacement of the component, either by temporal analysis of the signal delivered by the sensor, or by frequency analysis of the same signal. The positioning of this capacitive sensor has the advantage of being able to directly deliver the signature of the fault in the mechanical component and thereby eliminate diagnosis errors.

The device of the invention can be connected to a means of display (e.g., display screen or monitor) in order to view the position of any fault in the bearing, after the variation in the distance ($\Delta x$) has been calculated.

It should be obvious to those skilled in the art that this present invention allows embodiments in many other specific forms without moving outside of the field of application of the invention as claimed. As a consequence, these present embodiments should be considered as illustrations, but which can be modified within the field that is determined by the scope of attached claims.

In the drawings and specification, there have been disclosed typical embodiments on the invention and, although specific terms have been employed, they have been used in a generic and descriptive sense only and not for purposes of limitation, the scope of the invention being set forth in the following claims.

The invention claimed is:

1. A device for monitoring the vibration generated by a bearing in a machine, the device comprising:
   two coaxial rings, one outer ring (1) and one inner ring (2), one of which is fixed in relation to the structure of the machine, and the other rotating;
   at least one rolling element (3) moveably positioned between the outer and inner ring;
   at least two conducting elements forming conducting plates (5, 6) of at least one capacitor, one plate (5) positioned at a distance from another plate (6) formed by a conducting part of the rotating ring;
   at least one non-conducting positioning means (4) connected to one of the rings that is fixed in relation to the structure of the machine, the non-conducting positioning means (4) having at least one housing for positioning at least one conducting element; and
   at least one partitioning means (8) supporting the non-conducting positioning means (4) to define a space (7) between the plates (5, 6), the space forming a dielectric insulating medium, the partitioning means forming a sealed enclosure for the insulating medium (7) by contacting a part of the surface of the rotating ring;
   wherein vibrations generated by other components of the machine pass through the bearing, with each of the other components of the machine having its own frequency signature; and
   wherein the bearing defines an axis of rotation (Z-Z).

2. A device according to claim 1, wherein the partitioning means (8) is formed by a metal blade attached to the positioning means (4) and in contact with a part of the surface of the rotating ring.

3. A device according to claim 1, wherein the partitioning means (8) is formed by an elastic gasket attached to the positioning means (4), the elastic gasket having a lip that is in contact with a part of the surface of the rotating ring.

4. A device according to claim 1, wherein at least three conducting plates (5a, 5b, 5c) are positioned by respective non-conducting positioning means (4) radially in relation to the conducting plate (6) formed by a part of the surface of the rotating ring of the bearing, wherein axes passing respectively through the positions of each of the conducting elements and the center of rotation of the bearing form angles (a) of not more than about 120° between each other.

5. A device according to claim 4, wherein opposing conducting plates (5.1, 6) comprise a convex plate and a concave plate in a plane that is perpendicular to the axis of rotation (Z-Z) of the bearing.

6. A device according to claim 1, wherein the non-conducting positioning means (4) positions one of the conducting plates (5.2) axially in relation to another conducting plate (6) formed by a part of the surface of the rotating ring of the bearing.

7. A device according to claim 1, wherein the non-conducting positioning means (4) positions a pair of conducting plates, one radially (5.1) and the other axially (5.2) in relation to the conducting plate (6) formed by a part of the surface of the rotating ring of the bearing.

8. A device according to claim 7, wherein the space (7) forming the dielectric insulating medium is common to the pair of capacitors formed by the two conducting plates (5.1, 5.2) positioned by the non-conducting positioning means (4) and to the conducting plate (6) formed by a part of the surface of the rotating ring of the bearing.

9. A device according to claim 1, wherein the at least one non-conducting positioning means (4) positions three pairs of conducting elements on each face of the bearing, the three pairs of conducting elements positioned equidistant from the axis of rotation (Z-Z) of the bearing, and so that, in a plane perpendicular to the axis of rotation (Z-Z) of the bearing, the planes passing respectively through the axes of symmetry of each of the pairs of conducting elements and the center of rotation of the bearing form angles (a) of about 120° between them, each of the three pairs of conducting elements having one conducting element (5.1) positioned radially and another conducting element (5.2) positioned axially in relation to the rotating ring of the bearing, the conducting elements forming first plates of six different capacitors respectively.

10. A device according to claim 1, wherein the non-conducting positioning means (4) is a non-conducting ring attached to the ring of the bearing that is fixed in relation to the structure of the machine.

11. A device according to claim 1, further comprising at least one means for adjusting the distance that separates the conducting plates forming a part of a capacitor.

12. A device according to claim 1, wherein pairs of plates of each of the capacitors are associated respectively with an electronic circuit forming a charge amplifier (CA) that is intended to deliver, in real time, a vibration signal representing the movements of one plate in relation to another plate due to vibration during the operation of the mechanical bearing.

13. A device according to claim 12, wherein each pair of plates is associated with an electronic circuit forming a charge amplifier (CA), where the plate (6) formed by a part of the surface of the rotating ring is grounded and the plate (5) positioned by the non-conducting positioning means (4) is connected to the inverting input (i) of a high-impedance integrated linear amplifier (ILA) by a screened cable (9, 9.1, 9.2), the screen of which (9.3) is connected to the non-inverting input of the ILA, with the non-inverting input of the ILA being connected to a generator supplying a direct voltage (V), and with an output of the ILA being connected to its inverting input via a capacitor (Cf) and a resistor (R) mounted in parallel.

14. A device according to claim 13, wherein the output of the integrated linear amplifier (ILA) is connected to the input of an analogue to digital converter, the output of which is used by a microprocessor circuit to calculate the distance variation, by the execution of a program implementing the following formula:

$$\Delta x = -\frac{C_f}{2 \cdot V \cdot S_c} \Delta V_s$$

the microprocessor configured to activate an alarm when the calculated distance variation reaches a stored threshold, with $\Delta x$ representing the variation of the distance (d) separating the two capacitor plates, $\Delta V_s$ representing the variation of the voltage at the output of the amplifier, V representing the DC component of the voltage at the input of the amplifier, Sc representing the sensitivity of the capacitance and Cf representing the capacitance of the capacitor connecting the output of the ILA to the inverting input.

15. A device according to claim 14, further comprising a means for detecting the frequency of rotation of the bearing in order to perform measurements when the rings of the bearing are in a particular position in relation to each other.

16. A device according to claim 12, further comprising at least one means for processing the frequency of the measured vibration signal at the plates (5, 6) of the capacitor, the frequency processing means providing the vibration signal of at least one of the various components of the machine by comparison with the respective vibration signature of each of the components of the machine recorded in at least one storage resource.

17. A device according to claim 12, further comprising at least one means for processing the timing of the vibration signal of at least one of the components of the machine, the time processing means providing statistical parameters of the vibration signal to be compared with statistical fault parameters recorded in a storage resource.

18. A method for monitoring the vibration generated by a bearing in a machine, the bearing formed by two rings, one fixed and the other rotating, the device having at least one capacitive sensor, the vibration generated by other components of the machine passing through the bearing, the method comprising the step of:
    measuring the induced charges by capacitive coupling to a first conducting plate (5) of a variable-gap capacitor positioned by a non-conducting positioning means attached to the ring that is fixed in relation to the structure, with a second conducting plate (6) formed by a part of the surface of the rotating ring of the bearing being at a fixed potential.

19. A method according to claim 18, wherein the plates are associated with an electronic circuit forming a charge amplifier (CA), the second plate (6) formed by the rotating ring which is grounded, the first plate (5) positioned by the non-conducting positioning means (4) and connected to the inverting input (i) of a high-impedance integrated linear amplifier (ILA) by a screened cable (9, 9.1, 9.2), the screen of which (9.3) is connected to the non-inverting input of the ILA, with the non-inverting input of the ILA being connected to a generator supplying a DC voltage (V), and the output of the ILA connected to its inverting input via a capacitor (Cf) and a resistor (R) mounted in parallel, the method further comprising the step of:

calculating the variation (Δx) of the distance separating the first and second plates (5, 6) of the capacitor from the variation of the voltage (ΔVs) at the output of a charge amplifier (CA), using the relation:

$$\Delta x = -\frac{C_f}{2 \cdot V \cdot S_c} \Delta V_s$$

with Δx representing the variation of the distance (d) separating the two capacitor plates, ΔVs representing the variation of the voltage at the output of the amplifier, V representing the DC component of the voltage at the input of the amplifier, Sc representing the sensitivity of the capacitance and Cf representing the capacitance of the capacitor connecting the output of the ILA to the inverting input.

20. A method according to claim 19, wherein the output of the integrated linear amplifier (ILA) connected to the input of an analogue to digital converter (ADC), the output of which is used by a microprocessor circuit (MP) to calculate the distance variation by the execution of a program (Prog), the method further comprising the step of:

triggering an alarm when the calculated distance variation (Δx) of the gap between the two plates reaches a threshold value.

21. A method according to claim 18, wherein the device has a resource for storing vibration signatures of each of the components of the machine, the method further comprising the steps of:

measuring a vibration signal at the plates (5, 6) of the capacitor positioned at the bearing;

comparing the measured vibration signal with the stored vibration signature of at least one given component of the machine; and determining and then extracting the vibration signal associated with a given component of the machine from the measured vibration signal.

22. A method according to claim 21, wherein the device has a resource for the storage of fault threshold values of statistical parameters, the method further comprising the steps of:

measuring the vibration signal at the plates (5, 6) of the capacitor positioned at the bearing;

calculating the statistical parameters of the measured vibration signal;

comparing the calculated statistical parameters with stored fault threshold values; and determining the severity of the fault.

23. A method according to claim 22, wherein the device has at least one display means, the method further comprising the step of:

displaying the position and the severity of a fault on the at least one display means.

\* \* \* \* \*